No. 672,105. Patented Apr. 16, 1901.
H. A. PALMER.
APPARATUS FOR CLOSING ENDS OF RUBBER TIRES TOGETHER.
(Application filed Nov. 22, 1900.)
(No Model.)
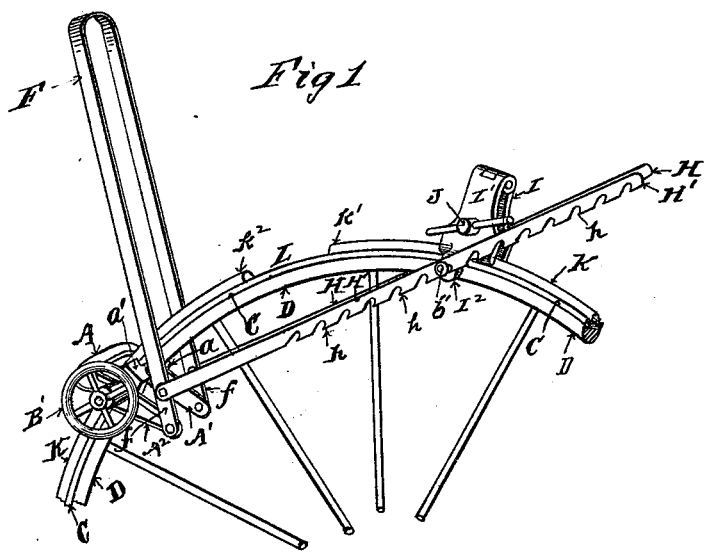
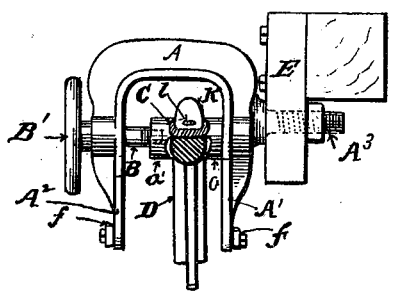
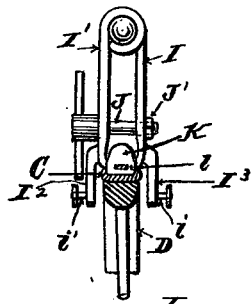
Witnesses.
Inventor.
Harry A. Palmer.
By
Atty.

UNITED STATES PATENT OFFICE.

HARRY A. PALMER, OF ERIE, PENNSYLVANIA.

APPARATUS FOR CLOSING ENDS OF RUBBER TIRES TOGETHER.

SPECIFICATION forming part of Letters Patent No. 672,105, dated April 16, 1901.

Application filed November 22, 1900. Serial No. 37,356. (No model.)

*To all whom it may concern:*

Be it known that I, HARRY A. PALMER, a citizen of the United States, residing at Erie, in the county of Erie and State of Pennsylvania, have invented certain new and useful Improvements in Apparatus for Closing the Ends of Rubber Tires Together; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in apparatus for closing the ends of rubber tires together. In setting rubber tires the ends of the rubber tire have to be pushed back and compressed upon the retaining-band some distance in order to permit the ends of the band to be secured together by brazing or otherwise, and after the band is so secured the compressed ends of the rubber tire must be brought together again. To accomplish this result, I construct an apparatus consisting substantially of a clamp mechanism adapted to be clamped to the metal tire or felly of the wheel, a clamp mechanism adapted to be clamped to the rubber tire to be moved forward, and a lever pivoted to one of said clamps and connected to the other by means of notched links, whereby the clamps can be brought toward each other.

The features of my invention are hereinafter fully set forth and described, and illustrated in the accompanying drawings, in which—

Figure 1 is a perspective view of a mechanism embodying my invention. Fig. 2 is a transverse view in elevation of the clamp mechanism secured to the metal tire of the wheel forming part of my apparatus. Fig. 3 is a like view of the clamping mechanism secured to the rubber tire, forming part of my apparatus.

In the drawings thus illustrating my invention, A is a yoke provided with arms A' A². On the arm A' there is a fixed jaw $a$, and through the arm A² there is a screw B, provided with a hand-wheel B', carrying a jaw $a'$, so that a metal wheel-tire C or a wheel-felly D may be firmly clamped between the jaws $a\ a$, as illustrated in Figs. 1 and 2. To one arm A' of the yoke A there is secured a bolt A³, by means whereof the yoke A can be secured to a convenient support E. The arms A' and A² extend downward below the jaws $a\ a'$, and to the ends thereof are pivoted the arms $ff$ of a U-shaped lever F, and to the arms $ff$ of the lever F there are pivoted two links H H', provided with hooked teeth $h$ in their lower edges, as and for the purpose hereinafter set forth. Another part of my device consists, substantially, of another clamp composed of jaws I I', hinged together at their upper ends and provided with a hand-screw and nut J J' for closing the lower ends of said jaws together, so as to clamp the lower ends of the jaws I I' upon a rubber vehicle-tire K, as illustrated in Figs. 1 and 2. Projecting downwardly from the outsides of the lower portions of the jaws I I' are arms I² and I³, provided at their lower ends with studs $i$ and $i'$, having heads on their outside ends.

In operation the yoke A is clamped to the metal tire C or the felly D of a vehicle-wheel at one side of the opening L between the ends $k'$ and $k²$ of the rubber tire secured thereon. The clamp I I' is then clamped to the rubber tire C at a sufficient distance beyond and at the opposite side of the opening L, so that when the end $k'$ of the tire K is moved forward into contact with the end $k²$ of the tire K the compression therein will be partially removed. The lever F is then moved forward and the links H H' placed on the studs $i\ i'$, so that the hooks $h$ thereon will engage therewith. Then by moving the lever F backward the end $k'$ of the rubber tire K is moved forward toward the end $k²$ thereof, and this movement forward and back of the lever F is repeated until the opening L between the ends of the rubber tire is closed.

I have thus shown and described a convenient mechanism for utilizing my invention. I do not, however, desire to confine myself to the exact construction thereof shown and described, as it is obvious that it can be modified in many particulars without departing from the spirit of my invention.

Therefore what I claim as new, and desire to secure by Letters Patent of the United States, is—

1. The combination in an apparatus for closing the ends of rubber tires together, of a clamp mechanism adapted to be clamped to a metal tire or wheel-felly, a lever pivoted thereto, clamp-jaws adapted to clamp a rubber tire, and links connecting said lever with the last-named clamp-jaws, substantially as and for the purpose set forth.

2. The combination in an apparatus for closing the ends of rubber tires together, of a clamp mechanism, means thereon for securing the same to a suitable support, a lever pivoted to arms on said clamp mechanism, clamp-jaws adapted to clamp a rubber tire, studs on said clamp mechanism, and notched links pivoted to said lever and adapted to engage said studs, substantially as and for the purpose set forth.

3. The combination in an apparatus for closing the ends of rubber tires together, of a clamp mechanism adapted to be secured to a metal wheel-tire, lever mechanism pivoted to said clamp below the plane of the periphery of the metal tire, a clamp mechanism adapted to be secured to a rubber tire, and links pivoted to the lever on the metal-tire clamp below the plane of the periphery of the metal tire and engaging the rubber-tire clamp below the periphery of the rubber tire, substantially as and for the purpose set forth.

In testimony whereof I affix my signature in presence of two witnesses.

HARRY A. PALMER.

Witnesses:
H. M. STURGEON,
F. J. BASSETT.